Jan. 7, 1958 R. STUART-WILLIAMS 2,819,456

MEMORY SYSTEM

Filed March 26, 1953 3 Sheets-Sheet 1

INVENTOR.
Raymond Stuart-Williams

BY Samuel Lindenberg
ATTORNEY

INVENTOR.
Raymond Stuart-Williams
BY Samuel Lindenberg
ATTORNEY

INVENTOR.
Raymond Stuart-Williams
BY Samuel Lindenberg
ATTORNEY

United States Patent Office 2,819,456
Patented Jan. 7, 1958

2,819,456

MEMORY SYSTEM

Raymond Stuart-Williams, Princeton, N. J., assignor to Radio Corporation of America, a corporation of Delaware Application March 26, 1953, Serial No. 344,735

15 Claims. (Cl. 340—174)

Figure 1:
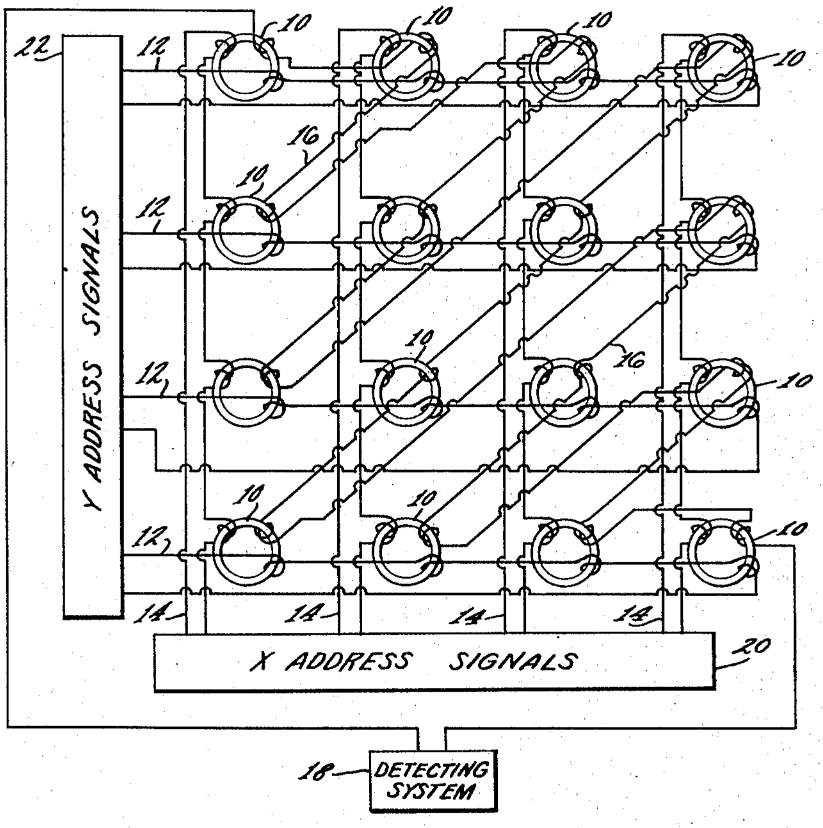

This invention relates to magnetic storage devices, and more particularly to an improved method of and means for deriving information from a random access magnetic storage device.

A random access static magnetic memory has been described in an application by Jan A. Rajchman, filed September 30, 1950, Serial No. 187,733, and assigned to the same assignee as the present application, and has also been described in an article by Jay W. Forrester, in the Journal of Applied Physics, January 1951, page 44, entitled, "Digital Information Storage in Three Dimensions Using Magnetic Cores." In such a memory system, a bit of information or a binary digit is represented by the magnetic condition or direction of saturation of a magnetic core. A magnetic core may, for example, be magnetic material in the shape of a toroidal ring. The direction of the saturation of a core is altered as required in accordance with the information sought to be stored. The elements or cores which make up the memory are usually arranged in columns and rows. Each core has at least three windings on it. A row coil consists of a series connection of one of the windings on each core in a row of cores. A column coil consists of a series connection of a second of the windings on each core in a column of cores. A reading coil consists of a series connection of the remaining winding of all the elements. Accordingly, each core is inductively coupled to one row coil, one column coil and the reading coil.

Current excitation of a row coil and a column coil, so that each coil produces at least one-half the magnetomotive force required, results in a core inductively coupled to both these coils having its magnetic condition changed, if the element is not already in the condition to which it is being driven. Thus "writing" into a matrix is performed by selecting a row and a column coil which are coupled to a desired core and exciting these coils simultaneously with a pulse of current. Reading the condition or direction of saturation of a core consists of selecting the row and column coil coupled to the core and exciting these coils with current having a given polarity. If the core has the same polarity as that to which the driving field tends to drive it, substantially no voltage pulse is induced in the reading winding. If the element or core has its polarity changed by the driving field, then a voltage pulse is induced in the reading winding.

In an application for "Magnetic Information Handling System," filed on March 8, 1952, Serial No. 275,621, now U. S. Patent No. 2,691,154, by Jan A. Rajchman, which is also assigned to the same assignee, there is described an improvement in the construction of a magnetic matrix of the type described. This improvement consists of winding the reading coil of all the magnetic elements so that the reading windings are balanced along the columns and rows whereby desired-to-undesired signal ratio is considerably improved. One system of winding, as pointed out in the aforesaid Patent No. 2,691,154, may be a checkerboard type whereby the windings are reversed on every adjacent core. It has been found, in the employment of a reading coil balancing system in a magnetic matrix where all the cores in the matrix are perfectly uniform, that two types of output signals may be obtained. In the first type, when a core selected to be read is driven from one polarity (N) to the opposite polarity (P), the signals, from all the cores, which make magnetic excursions as a result of drives applied from the excited row and column coils, cancel, with the exception of those from the selected core and that from two of the non-selected excited cores. The non-selected excited cores are those which receive excitation from either a row coil alone or a column coil alone. The signal from the selected core is of opposite polarity to those from the two non-selected cores, and therefore the resultant signal obtained is the difference of these. In the second type, if the selected core is in condition P, in which event it does not change its state, the signal from the selected core (caused by a slight magnetic excursion in the saturated region) may be twice the signal from each of the two non-selected cores and the resulting output is substantially zero.

Manifestly, the obtention of a group of perfectly uniform cores is extremely difficult, if not impossible. The conditions required to obtain the above indicated ideal results assume that not only are the wave forms from all cores exactly the same, but that they are also exactly coincident in time. This exact coincidence must result in order that the signal cancellation occur. Due to the nature of the construction of the matrices, exact coincidence in times as well as similarity of waveforms is difficult to achieve. In general, to obtain perfectly uniform cores, they must all be similar, both mechanically and electrically. It is not too difficult to maintain uniform magnetic properties for the cores, but properties such as the conductivity, the mean diameter and the cross-sectional area do vary from core to core. The conductivity varies in metal cores by virtue of the fact that a shorted lamination in cores made of wraps of metal does change the effective conductivity; in ferrospinels traces of impurities can change the conductivity without changing the magnetic properties. Variations of conductivity cause variations in the time taken for a core either to be driven from one polarity to the opposite polarity or to complete a minor magnetic excursion.

The cores used for magnetic memories are very small and therefore have a small total diameter. However, small variations in diameter may represent a large fraction of the mean diameter. This alters the magnetomotive force required to turn over a core. Since the same force is applied to all cores, then some cores turn over faster than others. Variations in cross-sectional areas make a different total flux change in each case and hence differences in voltages obtainable, but do not affect the time scale. Since the position in time of a signal is dependent upon the position of a core in a matrix as well as upon these other factors, it would appear desirable to obtain a method of reading the magnetic matrix which provides accurate results despite these other, as yet uncontrollable, factors. Heretofore, the method of reading has been based upon an amplitude and strobing arrangement. In other words, after two coils coupled to a desired core are excited, the reading coil is connected to a circuit which discriminates against signals less than a certain amplitude occurring within an interval at a time subsequent to the occurrence of the leading edges of the exciting pulses. This system has not proven sufficiently satisfactory in view of the rigid requirements for the time of gating. The pulse amplitude of unwanted signals also varied so that it was oftentimes difficult to tell whether or not the output was an actual reading pulse or the effect of a random circuit disturbance.

It is accordingly an object of this invention to provide a method and means for reading a magnetic matrix which is independent of the amplitude of a signal.

It is a further object of this invention to provide a method of reading a magnetic matrix which is not dependent upon time sampling of the output signals from a magnetic matrix.

Still a further object of this invention is to provide apparatus for reading the cores of a magnetic matrix which permit a reduction in the uniformity requirements for the mechanical and magnetic properties of the core selected for a matrix.

Still a further object of the present invention is to provide a novel and accurate system for reading the condition of the cores of a magnetic matrix.

These and other objects of the invention are achieved by providing apparatus wherein, in one instance, the signal obtained, upon reading a desired core in a magnetic matrix, is amplified and properly shaped. Undesirable portions are then clipped from the signal, which is then integrated and applied to a discriminator which provides an output only when the integrated portions of the signal exceed a certain minimum amplitude. In another embodiment of the invention, the signal is applied after amplification, to a two-way integrator which has its output applied to a limiter.

Figure 2:
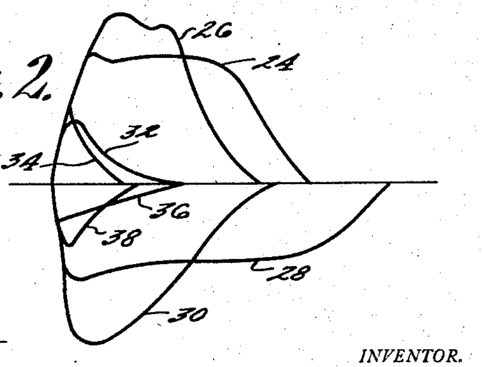
Figure 3:
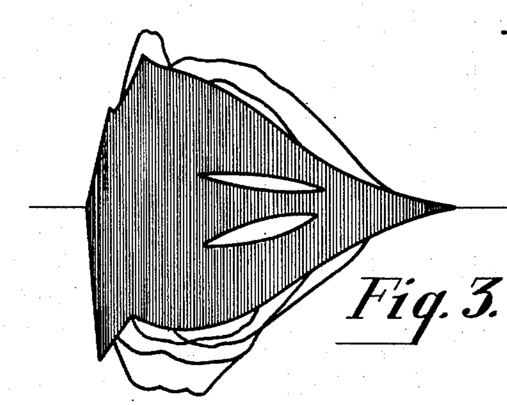

Figure 1 is a schematic drawing of a magnetic matrix of a type with which the present invention may be employed, Figure 2 displays simultaneously the wave shapes of the signals induced in a reading winding of Figure 1 when several cores are driven for reading, Figure 3 shows simultaneously all the signals obtained by driving all the cores in a magnetic matrix having a large number of cores. These signals are superimposed upon each other for the purpose of better illustrating the principles involved herein.

Figure 4A:
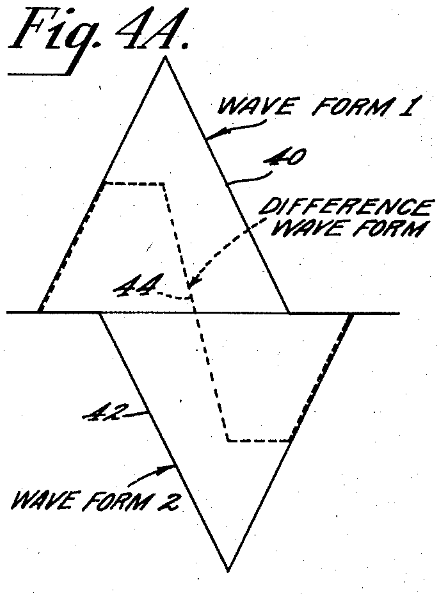
Figure 4B:
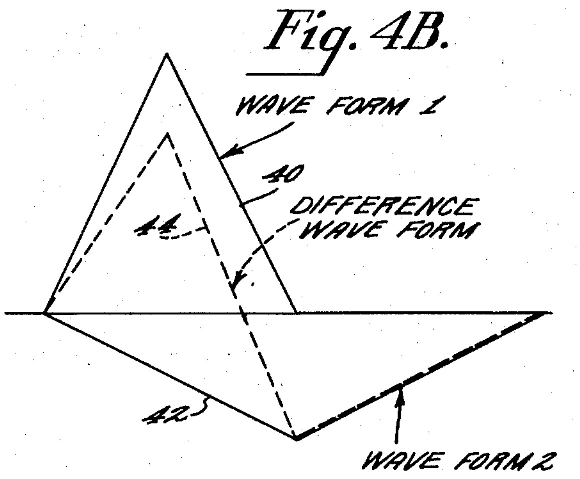
Figure 5:
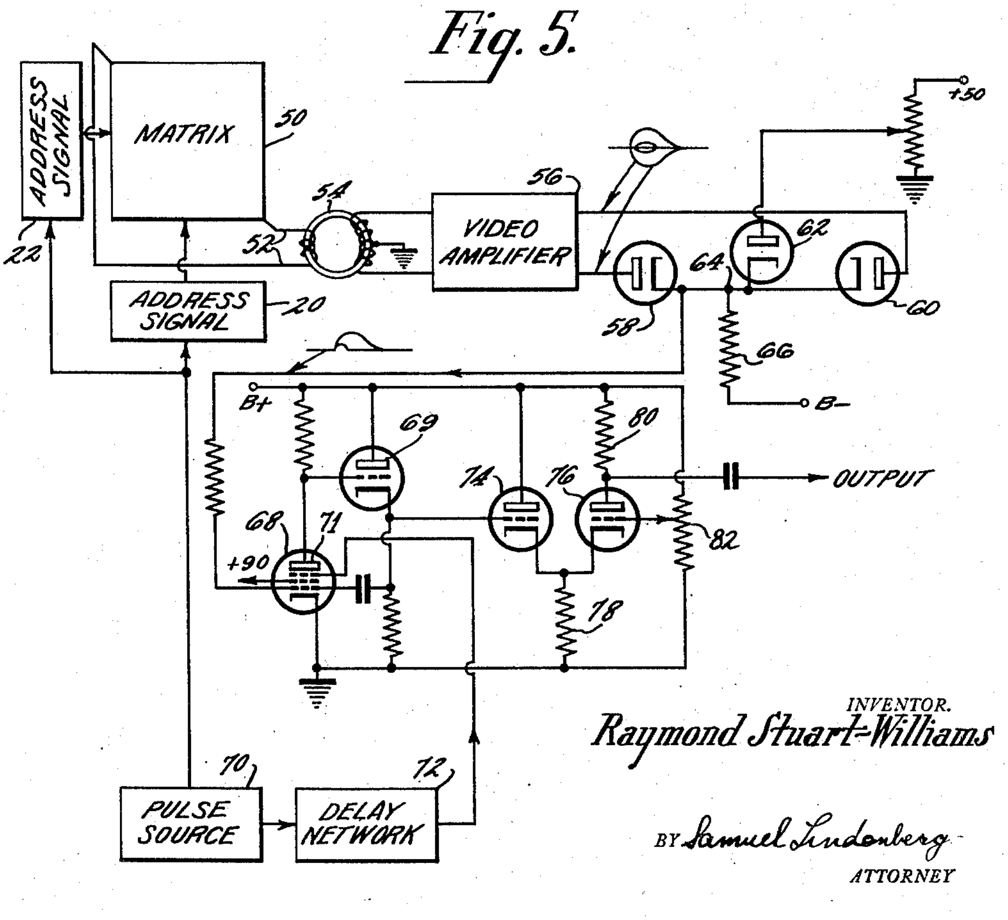
Figure 7:
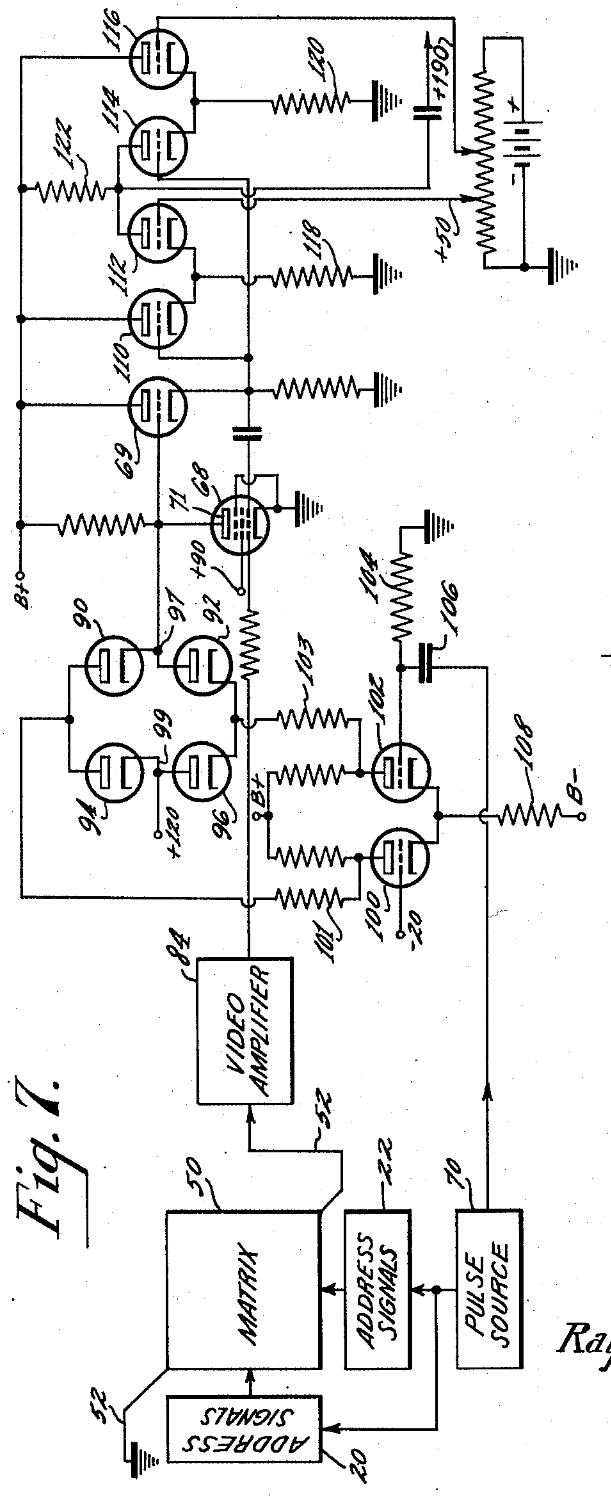
Figure 6B:
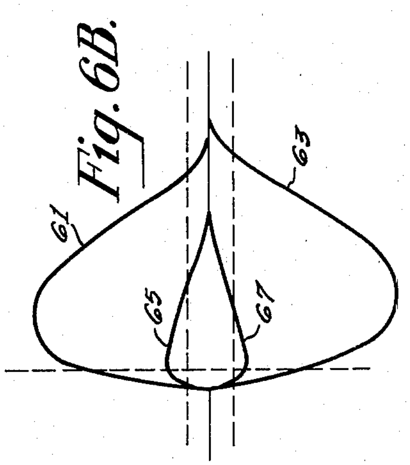
Figure 6A:
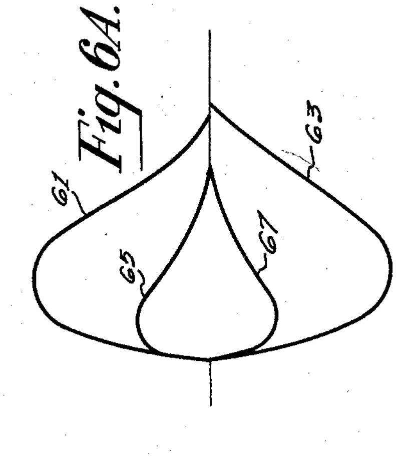

Figures 4A and 4B are wave shapes shown for the purpose of illustrating the advantage of subtracting wave shape areas or integrals rather than amplitudes, Figure 5 is a schematic diagram showing one embodiment of the invention, Figures 6A and 6B are curves showing the waveshapes obtained in operating the embodiment of the invention illustrated in Figure 5, and Figure 7 is a schematic diagram of another embodiment of the invention.

In Figure 1 there may be seen a static magnetic matrix memory having 16 cores 10 which are arranged in rows and columns. The system shown is exemplary of the type with which my invention is used. The cores are made of magnetic material, preferably of the type having a hysteresis loop of substantially rectangular shape. Each row of cores has coupled to each core a coil which is designated as a row coil 12. Each column of cores has coupled to each core in a column a coil which is designated as a column coil 14. A reading coil is coupled to every one of the cores in the matrix. The winding on each core, which may be designated as the reading winding, is wound, in the manner previously described, to balance out the unwanted signals from the cores. This is effectuated by a checkerboard arrangement for the reading coil as well as a polarity reversal of the windings on each core in the manner described in detail in application Serial No. 275,621, now U. S. Patent No. 2,691,154, above identified. As shown, the reading coil is connected to a system 18 for detecting the voltages induced in the winding when, in the process of reading, a core is driven from one saturation polarity to the opposite saturation polarity.

The method of storing information in every one of the cores is to leave them in a polarity P or polarity N, which can have significance in the binary code as "one" or "zero" as desired. A selected core is driven by applying exciting currents from the address signal sources 20, 22 to the row coil and column coils which are coupled to that core. The amplitudes of the currents supplied are such that the joint excitation of the row and column coils provide a sufficient magnetomotive force to the core to which they both are coupled to drive them from one to the other polarity. Other cores which are coupled to the excited column coil alone or the excited row coil alone do not receive a sufficient magnetomotive force to drive them from one polarity to the opposite polarity. They may, however, take a slight (that is, minor) magnetic excursion since the characteristics of magnetic materials are not linear in the saturated regions.

When it is desired to read the conditions of a desired core, an exciting current is applied to the row coil and to the column coil coupled to said core to drive the core to P. If the core is already in condition P, the currents applied thereto disturb it but little. If the core is in condition N, then the core will be driven to condition P, thus inducing a voltage in the reading coil coupled thereto. Accordingly, the condition of a core is manifested by the presence of absence of a pulse in the reading winding, corresponding to the core being in a condition N or a condition P. Means (not shown) is provided to restore the core to the condition in which it originally was, since the act of reading does destroy the information stored in the core if it is in a condition N. This apparatus may be excited by the presence of a pulse in the reading coil. The address signal sources 20, 22 may be switches or tubes or any suitable system for selectively applying the exciting currents to a row coil and a column coil coupled to a desired core.

In Figure 2 there is shown a few of the typical wave shapes obtained by driving a few cores in a typical matrix. The larger area wave shapes 24, 30 are received from cores which are driven from one polarity to the opposite polarity. The smaller area wave shapes 32—38 are received from non-selected cores or from cores which are driven but remain substantially at the same polarity of saturation. These cores are those which, for example, are in condition N, and receive drives from the excited coils in a direction P.

The reason that there are waveshapes of opposite polarity is because of the different senses of the reading coil windings on each one of the cores. The differences in waveshape durations as well as waveshape amplitudes for the different cores are noteworthy. The duration of the signals which are received from cores which are not driven from P to N also vary substantially both in amplitude and in time. Thus amplitude discrimination is an extremely delicate affair, since some of the lesser amplitude signals from cores which are turned over are substantially almost equal to the amplitude of others of the cores which are not to be turned over. Figure 3 is a representation of all the signals induced in the reading coil of a magnetic matrix superimposed upon each other. In these superimposed signals the two white areas above and below the base line are the areas of selection wherein a gating pulse and an amplitude selection of signals would give the most accurate discrimination between cores which turn over and cores which do not. Since the time scale is on the order of 7 microseconds from the start to the finish of the superimposed wave shapes along the abscissa, it would appear that the area of decision is an extremely small one and requires extreme accuracy in the strobing or gating apparatus, with a consequent large expense for the components required. The reason that the signals appear above and below the base line is that, as previously pointed out, the sense of the windings of the reading coil which is coupled to the cores of the matrix is periodically reversed in order to effectuate unwanted signal cancellation to the greatest extent possible.

As previously explained, many parameters affect the time scale of the signal, while few affect the total flux change. The flux change is proportional to $\int edt$ (the integral of the induced voltage with respect to time), or to the area of the wave forms, and therefore, if the nonuniformity in the reading coil signals is due largely to time variations, the areas of all change-over wave forms from cores driven from N to P should be similar. Likewise, the areas of all disturbed wave forms from non-selected cores making small magnetic excursions should be similar. This has been checked in a completed matrix and was found to be true, and thus the basis for discriminating one wave form from others that is not either time or amplitude dependent, is provided.

To illustrate the difference between cancellation provided by means of amplitude vs. cancellation provided by means of areas, in Fig. 4A there are shown two exactly similar wave forms 40, 42 that differ only in time of occurrence. The dotted waveshape 44 represents the result of subtracting the amplitudes of the waveform. An area subtraction of the two waveshapes 40, 42 would provide a result equal to zero. Likewise, an integration of the difference waveform, 44, will be zero since the net area of this curve about the center line is zero.

In Fig. 4B, two different shape, but equal area, wave forms 40, 42 have their instantaneous amplitudes subtracted, providing a difference wave form shown by the dotted waveshape 44 in which the area about the center line is also zero. Here again an area subtraction would provide a result equal to zero. Also, an integration of the dotted curve 44 would be zero since its net area about the center line is zero. The peak voltages of the resultant are large. It would therefore appear that if areas are used for voltage cancellation or discrimination, the cancellation is complete, while if amplitude is used, the resultant voltages would represent a serious disturbance. In a magnetic memory, an attempt at cancelling waves induced by several cores by opposing them and then using amplitude discrimination to determine whether or not an output which is significant has occurred can provide an erroneous indication. However, the employment of a circuit which, after all signals are algebraically combined by reason of the matrix construction, measures the net area of these resultant wave forms about a central line, provides a result which is free of any time variation inaccuracies, after sufficient time has elapsed so that even the longest wave form is finished.

With a measurement system of this type, it is only necessary to select cores for a matrix on the basis of total flux change. This eases the core manufacturing problem considerably, and also reduces the number of rejects obtained.

Figure 5 represents a schematic diagram of an embodiment of the invention. The magnetic matrix is represented by a rectangle 50 having the row and column coil address signal equipment 20, 22. Two leads 52 coming out of the rectangle represent the output leads of a reading winding coupled to every core in the matrix. This reading winding output is coupled to a non-linear transformer 54. This has the property of distorting an output signal so that large amplitude signals are passed through with a larger voltage gain than the small amplitude signals.

Figure 6A shows the wave shape of the output voltage received when two cores are read. The large positive and negative going waveshapes 61, 63 are the desired signals, and the small positive and negative going waveshapes 65, 67 are the undesired signals. The upper wave shape and the lower wave shape are received from the cores when they are driven from one polarity to the opposite polarity. The smaller upper and lower wave shapes are received from the cores when they are not selected but are coupled to excited selecting coils.

Figure 6B shows the wave shapes after passing through the non-linear transformer 54. The output of the transformer is applied to a push-pull Class A video amplifier 56 which provides an output signal having its base clamped to ground. A circuit of the type represented by the rectangle is well known in the art and may be found described in a book by Valley and Wallman, Vacuum Tube Amplifiers, published by McGraw-Hill Book Company, page 110.

The output of the push-pull amplifier 56 is applied to a converter and clipping circuit consisting of three diodes 58, 60, 62 having their cathodes connected to a common output point 64. Two of the diodes 58, 60 are coupled to the output of the amplifier to provide a unidirectional output. A resistor 66 is coupled to a negative bias potential from the common junction point 64 of the diodes to remove any D. C. charge built up as a result of the rectifying process. The third diode 62 has its anode connected to a positive potential source in order to clamp the cathodes of all the diodes above ground. Since the amplifier signals which are fed to the rectifying diodes have their base at ground potential, then only when these amplifier signals exceed the bias applied to these rectifier diodes by the third diode 62, is an output obtained from them. In effect, thus the lower portion of the wave form is clipped out. This may be seen by referring to Fig. 6B, wherein the area between the two dotted lines which are parallel to the base line represents the portion of the waveforms which is clipped out as a result of employing the biasing diode. The output from the common junction point 64 is connected to the signal grid of a Miller integrator 68 of the type wherein its feedback condenser is coupled through a cathode follower 69. An integrator of this sort is well known in the art and may be found shown and fully described on page 282 of Wave Forms, by Chance et al., published by the McGraw-Hill Book Company.

The Miller integrator is gated to commence its integration a short interval after the application of driving currents to the magnetic matrix, in order that the front end of the signal received from the matrix be clipped. Since the largest portion of the undesired transient signals occurs at the beginning of the driving currents to the matrix, this effectively eliminates from consideration a large portion of these undesired signals. This may be seen by reference to Figure 6B. The area to the left of the dotted line at right angles to the base line shows the portion of the signal which is gated out. It should be apparent that by the front and center clipping operation performed on the output of the reading coil a large portion of the unwanted signal has been removed. The gating signal for the Miller integrator is provided by a signal source 70 which is driven simultaneously with the energization of the address equipment, for reading, of the magnetic matrix. The output of this pulse source 70 is applied through a delay network 72 for reasons previously stated, to the suppressor grid of the Miller integrator 68. The output of the Miller integrator is obtained from the cathode follower tube 69 coupled to its plate. This is applied to a comparator or amplitude discriminator which may consist of a first and second triode 74, 76 having a common cathode resistor 78 connected to its two cathodes and a plate load resistor 80 connected to the anode of the second triode 76, which also has its grid biased by means of a potentiometer 82 connected across the source of operating potential. The first triode 74 has its anode returned directly to B+ and its grid coupled to the cathode of the output cathode follower 69. The bias applied is such that the first tube 74 is normally conducting, thus maintaining the second tube 76 cut off by virtue of the signal applied through the common cathode. When the plate voltage of the integrator 68 falls below a level which is determined by the biasing point of the second tube grid, the second tube conducts, thus producing a negative output. This biasing point can be set to a level such that there is no output obtained for the integrated voltage provided by a small area pulse detected in the reading winding, and a large output is provided for the integrated voltage provided by a large area pulse detected in the reading winding. It will therefore be appreciated that in order for an output to be obtained from the comparator, a large area pulse must exist so that the Miller integrator has an opportunity to build up a large integrated signal. Thus the comparator reliably provides an output only when a core being read turns over from N to P. Otherwise there is no output provided. Any small area signal, no matter how large its instantaneous amplitude, is discriminated against.

A second and preferred embodiment of the invention is shown in Fig. 7. Again, the magnetic matrix is represented as a rectangle 50 which is driven by address equipment 20, 22. Its reading winding 52 has its output lead connected to ground and its other lead connected to a single ended Class A video amplifier 84. This is represented by a rectangle, since these amplifiers are well known in the art and, for example, are shown in Vacuum Tube Amplifiers, by Valley and Wallman, published by McGraw-Hill Book Company, page 111.

The output of the single ended video amplifier is applied to the grid of a Miller integrator 68 of the same type as previously shown, which has its feedback condenser returned to the grid through a cathode follower tube 69. The plate 71 of the Miller integrator is set at an operating point by means of a clamping arrangement so that the integrator can integrate in either a positive or a negative direction. As previously indicated, the signals from the magnetic matrix 50 which are detected by the reading winding 52 may be of either polarity. By making the Miller integrator able to integrate in either direction, these signals may be readily handled directly.

The clamp consists of four diodes 90, 92, 94, 96 which are connected to the anodes of the clamp control amplifiers 100, 102 which serves to reset the operating point of the Miller integrator after each reading. Two of the clamping diodes 90, 94 have their anodes connected together and returned to the plate of the first tube 100 in the clamp amplifier through a resistor 101. The other two diodes 92, 96 in the clamp have their cathodes connected together and then returned to the plate of the second tube 102 in the clamp control amplifier through a resistor 103. The two sets of clamp diodes also are connected in series, one cathode-anode connection 97 being returned to the plate 71 of the Miller integrator, the other cathode-anode connection 99 being returned to a source of clamping potential which is the potential point at which it is desired that the anode of the integrator tube be clamped. The first tube 100 of the clamp amplifier has a negative bias applied to its grid. The second tube 102 of the clamp amplifier is returned to ground through a grid leak resistor 104 and through a condenser 106 is coupled to a pulse source 70 which is substantially the same source as is shown in Figure 5. The first and second tubes 100, 102 are coupled through a common cathode resistor 108 to a negative potential source.

Under standby conditions, the first tube 100 of the clamp amplifier maintains the anodes of the diodes 90, 94 to which it is coupled at a potential more positive than the clamping potential, and the second clamp amplifier tube maintains the cathodes of the clamp diodes 92, 96 at a potential which is more negative than the clamping potential. The second clamp tube in this condition is conducting, while the first is not. The clamp diodes are therefore conducting and the potential at which it is desided that the integrator tube plate be maintained is set, since, on the assumption of in insignificant diode resistance, the cathodes of the lower two clamp diodes are essentially at the clamping potential point, as is also the junction 97 between the cathode and anode of the two clamp diodes which are connected to the integrator tube anode 71. When it is desired to read from the magnetic matrix, the pulse source 70 is simultaneously energized with the address signal equipment for reading. A negative pulse is applied to the second clamp tube 102 to reverse the conduction and non-conduction of the first and second tubes from the standby condition. This serves to block the clamp diodes so that the plate of the Miller integrator is free to move positive or negative.

The output from the video amplifier is applied to the grid of the Miller integrator. The signal is integrated and the integrated result is applied to an amplitude comparator. Signals which exceed a certain positive value and signals which are more negative than a certain lower positive value are the desired signals and will provide an output from the comparator. Other signals in between these two levels will be rejected and no comparator output is obtained.

The comparator here effectively consists of two comparators of the type shown in Fig. 7. There are two sets of two triodes, 110, 112, 114, 116, each set having a common cathode bias resistor 118, 120, each having one of the tube anodes return to B+ through an anode load resistor 122, a common load in this instance. The other tube anodes are returned to B+ directly. One of the tubes 112 in the first set, which has the common plate load 122, has its grid returned to a potential which defines the lower limit below which it is desired that signals be accepted. The other tube 114, coupled to the common anode load 122, has its grid connected to the cathode of the cathode follower 69. The second tube 116 of the second set has its grid returned to a source of bias potential, which marks the upper limit above which it is desired to accept signals. As an illustration, bias to which both grids are returned in one instance is +50 and in the second instance is +190. Accordingly, an output is received only if the Miller integrator output exceeds 190 volts or is less than 50 volts. These levels may be desired to achieve suitable discrimination between desired large area signals and undesired small area signals.

The operation of the comparator is as previously described. If the integrator output is less than 50 volts, a transfer of conduction between the first, 110, and second, 112, tubes of the first comparator set occurs. The first tube 110 in the first comparator is normally conducting, since it is connected to the cathode of the cathode follower tube 69 which is maintained by the integrator anode potential at a higher positive potential than 50 volts (substantially 120 volts in the quiescent condition). When the signal from the cathode follower is below 50 volts, then the reversal in the conduction of the two tubes occurs with a consequent negative output obtained from across the common anode load resistor. The higher or second discriminator has the tube, to which the fixed high bias is applied, normally conducting and the tube connected to the cathode follower is normally cut off as a result. When the signal from the cathode follower 69 exceeds 190 volts, the tubes 114, 116 exchange conduction and a negative output pulse is provided across the common anode load resistor 122 indicative of this fact.

After the reading interval has expired, the negative pulse applied to the clamp amplifier is removed, thus permitting the clamp to become operative again and restore the plate of the Miller integrator to its starting operating potential. Thus, there has been provided an apparatus which produces the voltage-time integral of the wave forms obtained from the reading winding of a magnetic matrix. This is the integral of the wave forms and is made available as a definite voltage level at the end of the pulse. A small area wave form represents an unwanted signal, and provides a small amplitude integrated signal regardless of the size of instantaneous values of the signal before integration, while a large area waveform represents a wanted signal and provides a large amplitude integrated signal. This permits ready discrimination without extremely accurate strobing being required. The system also has other advantages.

In the process of reading, the reading signals often are accompanied by complex, high-frequency ringing, due to the fact that the magnetic matrix construction acts like a series of delay networks. The integral of this ringing over the pulse period is small. The amplitude of the integrated ringing signal, however, is large. Thus, the system provided herein rejects a ringing signal which heretofore had proved troublesome.

The wave shape diagrams are shown here both above and below a base line. It is to be understood that when a core is read it provides an output which can be represented as being either above or below the base line, depending upon the sense of the winding of the reading coil on that core. Both polarity wave shapes do not occur from a single core. The representation made herein was to show one of the requirements of the apparatus, namely, that it be able to handle waves of opposite polarity.

Of course the system described herein may also be used with three dimensional magnetic storage systems. These are systems wherein a separate magnetic matrix memory array is provided for each binary digit desired to be stored. These memories are operated in parallel. Each one has its own reading coil. Therefore each reading coil can be coupled to an integrating system of the type described above.

There has therefore been described herein a system for discriminating between wanted and unwanted reading signals which obviates the requirements of absolutely mechanical similarity between cores chosen for a magnetic matrix. The system also provides apparatus which permits the distinction between wanted and unwanted signals on a basis whereby there is eliminated the necessity for accurate gating and amplitude discriminating between the signals. The system described is relatively inexpensive, reduces the cost of the magnetic matrix components as well as the reading circuit, and produces a reliability of the results of reading a magnetic matrix to a degree which has not been available heretofore.

What is claimed is:

1. The combination with a magnetic memory matrix of the type having (1) a plurality of cores made of magnetic material, said cores being arrayed in columns and rows, (2) a plurality of row coils, each row coil being inductively coupled to all the cores in a different row, (3) a plurality of column coils, each column coil being inductively coupled to all the cores in a different column, (4) means to selectively excite a row coil and a column coil to drive from saturation in one polarity to the opposite polarity a desired core coupled to said selected row and column coils, and (5) a reading coil inductively coupled to all the cores in said memory, of a system for increasing the discrimination between the wanted and unwanted reading signal obtained when interrogating a core by exciting a row and a column coil comprising integrating means coupled to the output of said reading coil, and amplitude discriminating means coupled to receive the output from said integrating means to provide an output truly indicative of the wanted reading signal.

2. The combination with a magnetic memory matrix of the type having (1) a plurality of cores made of magnetic material, said cores being arrayed in columns and rows, (2) a plurality of row coils, each row coil being inductively coupled to all the cores in a different row, (3) a plurality of column coils, each column coil being inductively coupled to all the cores in a different column, (4) means to selectively excite a row coil and a column coil to drive from saturation in one polarity to the opposite polarity a desired core coupled to said selected row and column coils, and (5) a reading coil inductively coupled to all the cores in said memory, of a system for increasing the discrimination between the wanted and unwanted reading signal obtained when interrogating a core, by exciting a row and a column coil comprising means to distort the output from said reading coil, means to integrate the output from said distorting means, an amplitude discriminator and means to apply the output of said integrating means to said amplitude discriminator to obtain an output truly indicative of the wanted reading signal.

3. The combination with a magnetic memory matrix of the type having (1) a plurality of cores made of magnetic material, said cores being arrayed in columns and rows, (2) a plurality of row coils, each row coil being inductively coupled to all the cores in a different row, (3) a plurality of column coils, each column coil being inductively coupled to all the cores in a different column, (4) means to selectively excite a row coil and a column coil to drive from saturation in one polarity to the opposite polarity a desired core coupled to said selected row and column coils, and (5) a reading coil inductively coupled to all the cores in said memory, of a system for increasing the discrimination between the wanted and unwanted reading signal obtained when interrogating a core by exciting a row and a column coil comprising a non-linear transformer to which signal output from said reading coil is applied, means to eliminate a portion of the output signal of said transformer, means to integrate the remaining portion of the output signal of said transformer, an amplitude discriminator, and means to apply the output of said integrating means to said amplitude discriminator to provide an output truly indicative of the wanted reading signal.

4. A system as recited in claim 3 wherein said means to eliminate a portion of the output signal of said transformer includes rectifier means coupled between the output of said non-linear transformer and the input of said integrator, means to bias said rectifier means to reject signals below a desired amplitude level, and means to maintain said means to integrate inactive for a desired interval after the commencement of output from said rectifier means is received.

5. The combination with a magnetic matrix memory of the type having (1) a plurality of magnetic cores, (2) means to drive a desired one of said cores from magnetic saturation in one polarity to magnetic saturation in the opposite polarity, and (3) a reading coil coupled to all said cores, of means to discriminate between wanted and unwanted reading signal comprising means to integrate signals above and below a predetermined level coupled to receive the output from said reading coil, and discriminator means to provide an output only upon receiving signals above or below a predetermined amplitude range coupled to receive the output of said means to integrate.

6. A system as recited in claim 5 wherein said means to integrate signals above and below a predetermined level includes means to clamp said means to integrate signals to said predetermined level, and means to inactivate said clamp during desired reading signal intervals.

7. A system for increasing the discrimination between the wanted and unwanted reading signal provided when the condition of a core in a magnetic core memory matrix is interrogated comprising means to integrate the reading signal output from said matrix, an amplitude discriminator, and means to apply the output of said integrating means to said amplitude discriminator, to provide an output truly indicative of the wanted reading signal.

8. A system for increasing the discrimination between the wanted and unwanted reading signals provided when the condition of a core in a magnetic static matrix memory is interrogated comprising a non-linear transformer to which the reading signal output from said matrix is applied, means to eliminate a first portion of the output of said transformer, means to integrate the remaining portion of the output of said transformer, an amplitude discriminator, and means to apply the output of said integrating means to said amplitude discriminator to provide an output truly indicative of the wanted reading signal.

9. A system for increasing the discrimination between the wanted and unwanted reading signals provided when the condition of a core in a magnetic static matrix memory is interrogated comprising means to distort the reading signal output from said matrix, means to integrate said distorted reading signal, an amplitude discriminator, and means to apply the output of said integrating means to said amplitude discriminator to provide an output truly indicative of the wanted reading signal.

10. A system for increasing the discrimination between the wanted and unwanted reading signals provided when the condition of a core in a magnetic static matrix memory is interrogated comprising means to integrate signals above and below a predetermined level coupled to receive the output from said reading coil, means to clamp said means to integrate signals to said predetermined level, means to inactivate said clamp during desired reading signal intervals, and discriminator means to provide an output only upon receiving signals above or below a predetermined amplitude range coupled to receive the output of said means to integrate.

11. A magnetic memory comprising a plurality of magnetic cores having a substantially rectangular hysteresis loop; a reading coil coupled to all the said cores; means to apply a magnetomotive force to a selected one or more of said cores; and means to discriminate against noise voltages induced by minor magnetic excursions of said cores, said means to discriminate including integrating means coupled to said reading coil.

12. A magnetic memory comprising a plurality of magnetic cores having a substantially rectangular hysteresis loop; a reading coil coupled to all the said cores; means to apply a magnetomotive force to a selected one or more of said cores; and means to discriminate against noise voltages induced by minor magnetic excursions of said cores, said means to discriminate including integrating means coupled to said reading coil and amplitude discriminating means coupled to said integrating means to receive the output of said integrating means for providing an output indicative of a desired signal from said selected one or more cores.

13. A magnetic device having a plurality of magnetic cores each having a hysteresis loop of substantially rectangular shape, a reading coil coupled to said cores, a selected one of said cores to be read by a voltage induced in said reading coil, and means to discriminate against noise voltages induced in said coil by minor magnetic excursions of said cores comprising integrating means coupled to said reading coil.

14. A magnetic device having a plurality of magnetic cores each having a hysteresis loop of substantially rectangular shape, a reading coil coupled to said cores, a selected one of said cores to be read by a voltage induced in said reading coil, and means to discriminate against noise voltages induced in said coil by minor magnetic excursions of said cores comprising integrating means coupled to said reading coil and an amplitude discriminating means to receive the output of said integrating means.

15. A magnetic device comprising a plurality of magnetic cores each having a hysteresis loop of substantially rectangular shape, an output coil coupled to said cores, and means to discriminate against noise voltages induced in said coil by minor magnetic excursions of said cores when reading a selected one or more of said cores, said means comprising integrating means responsive to both positive and negative going signals.

References Cited in the file of this patent

UNITED STATES PATENTS

| | | |
|---|---|---|
| 2,439,446 | Begun | Apr. 13, 1948 |
| 2,531,642 | Potter | Nov. 28, 1950 |
| 2,548,532 | Hedeman | Apr. 10, 1951 |
| 2,594,104 | Washburn | Apr. 22, 1952 |
| 2,609,143 | Stibitz | Sept. 2, 1952 |
| 2,652,501 | Wilson | Sept. 15, 1953 |

OTHER REFERENCES

Publication I, RCA, Review pp. 183–185, June 1952.

Publication II, Radio News, pp. 3–5, December 1951.